United States Patent [19]

Yajima et al.

[11] Patent Number: 4,747,116
[45] Date of Patent: May 24, 1988

[54] SYNC SIGNAL DETECTING DEVICE

[75] Inventors: Hiroaki Yajima; Youichirou Tsuda, both of Saitama, Japan

[73] Assignee: Pioneer Electric Corporation, Tokyo, Japan

[21] Appl. No.: 842,582

[22] Filed: Mar. 21, 1986

[30] Foreign Application Priority Data

Mar. 22, 1985 [JP] Japan .............................. 60-41312[U]

[51] Int. Cl.$^4$ ............................................. H04L 7/00
[52] U.S. Cl. .................................... 375/114; 375/116; 371/47
[58] Field of Search ................ 375/114, 116; 358/148, 358/150; 371/47

[56] References Cited

U.S. PATENT DOCUMENTS

| | | | |
|---|---|---|---|
| 4,316,284 | 2/1982 | Howson | 375/116 |
| 4,356,566 | 10/1982 | Wada et al. | 375/116 |
| 4,607,378 | 8/1986 | Catlin et al. | 375/116 |
| 4,675,722 | 6/1987 | Hackett | 358/150 |

Primary Examiner—James J. Groody
Assistant Examiner—Michael D. Parker
Attorney, Agent, or Firm—Sughrue, Mion, Zinn, Macpeak, and Seas

[57] ABSTRACT

A sync signal detecting device includes a circuit for generating a sync signal pattern corresponding to an expected sync signal pattern contained in a digital signal, a circuit for comparing the digital signal with the sync signal pattern to detect a sync signal in the digital signal, a circuit for detecting errors in the digital signal, and a counter for counting the errors thus detected. A sync detection signal is outputted when, where no error is detected, the sync pattern is detected, and when, where errors are detected, the number of errors detected is a predetermined value or less and the part of the digital signal which is not coincident with the sync signal pattern is the part where the errors have been detected.

6 Claims, 2 Drawing Sheets

SYNC SIGNAL DETECTING DEVICE

BACKGROUND OF THE INVENTION

The present invention relates to a sync (synchronization) signal detecting device for detecting a sync signal included in a digital signal.

In transmitting or recording a digital signal, in order for the digital signal to be readily reproduced, in general, a sync signal is arranged at a predetermined position in each frame of digital data; various other data comes after the sync signal.

A conventional sync signal detecting device of this type, as shown in FIG. 1, includes a shift register 1, a sync signal pattern generating circuit 2, and a comparison circuit 3 for comparing the output signal of the shift register 1 with the output signal of the sync signal pattern generator 2.

A digital data signal applied to the shift register 1, which is transferred in synchronization with a clock signal data signal is equal in length to the sync signal included in the digital data signal. The sync signal pattern generating circuit 2 generates the same pattern as that of the sync signal in synchronization with the clock signal. In the comparison circuit 3, the output signal of the shift register 1 is compared with that of the sync signal pattern generating circuit, and when they are the same, a detection signal is produced.

However, since the conventional sync signal detecting device provides the detection signal only when the input signal and the sync signal pattern coincide completely with each other, if the sync signal cannot be detected, the data of the frame cannot be read.

In order to overcome this difficulty, heretofore the sync detecting device has been provided with a sync signal protecting device which operates in accordance with the expected period of arrival of the sync signal so that when the sync signal cannot be detected within a predetermined period, a "hunting" operation is performed or a false sync signal is outputted. However, the device is necessarily intricate in construction and high in manufacturing cost.

Even if such a sync signal protecting circuit is added to the detecting device as described above, it is difficult to positively detect the sync signal in the case where it is not always periodically produced, for instance, in the case of an optical audio disc EFM signal recorded on a video disc. (See Japanese Patent Applications Nos. 27250/1985 through 272255/1985 filed by the present applicant.)

SUMMARY OF THE INVENTION

Accordingly, an object of the inventin is to eliminate the above-described difficulties accompanying a conventional sync signal detecting device.

The foregoing object and other objects of the invention have been achieved by the provision of a SYNC detecting device which comprises: sync signal pattern generating means for generating a sync signal pattern corresponding to the expected sync signal pattern in the digital signal applied to the detecting device; sync signal detecting means for comparing the digital signal with the sync signal pattern thus generated to detect a sync signal in the digital signal; error detecting means for detecting an error in the digital signal; and a counter for counting errors detected by the error detecting means. As a result of the above arrangement, the SYNC detecting device outputs a sync signal detection signal as follows: when, in the case where no error is detected by the error detecting means, the SYNC detecting device produces the detector signal when the sync signal detecting means detects the sync pattern; and when, in the case where errors are detected by the error detecting means, the SYNC detecting device produces the detection signal when the number of errors thus detected is equal to a predetermined value or smaller, and the part of the digitial signal which is not coincident with a sync signal pattern is the part where the errors have been detected.

The nature, principle and utility of the invention will become more apparent from the following detailed description when read in conjunction with the accompanying drawings.

DESCRIPTION OF THE PREFERRED EMBODIMENTS

Figure 1:
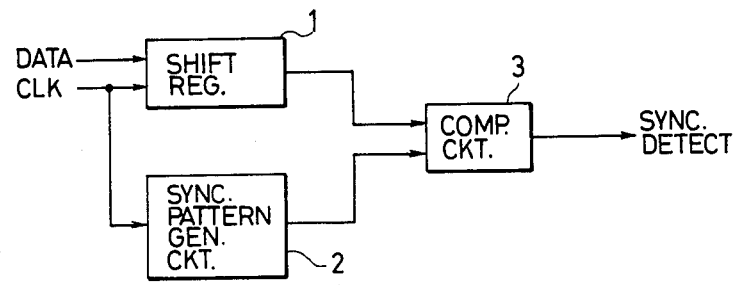
FIG. 1 is a block diagram showing a conventional sync signal detecting device.
Figure 2:
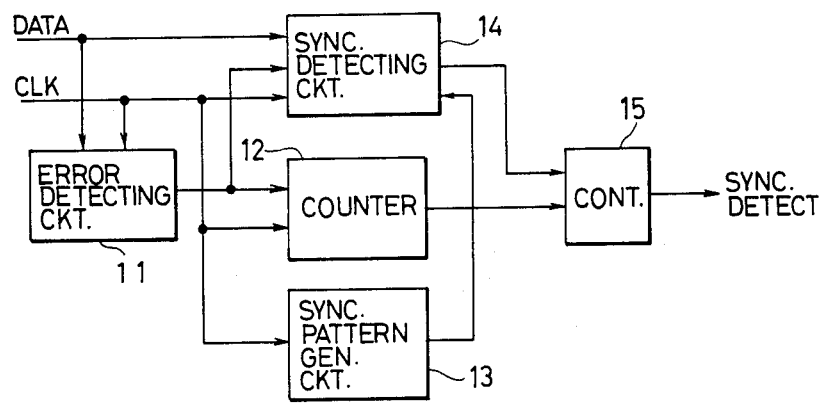
FIG. 2 is a block diagram showing a sync signal detecting device according to this invention.

A sync signal detecting device according to the invention, as shown in FIG. 2, includes an error detecting circuit 11 for detecting errors in a digital signal applied thereto, the number of errors detected being counted by a counter 12, and a sync signal pattern generator circuit 13 for generating a sync signal pattern, corresponding to the expected sync signal pattern of the applied digital signal in synchronization with a clock signal applied thereto. The output of the sync signal pattern generating circuit 13 is applied to a sync signal detecting circuit 14. In the sync signal detecting circuit 14, the digital signal applied thereto is compared with the sync signal pattern outputted by the sync signal pattern generating circuit 13. The sync signal detecting device further includes a controller 15 for providing a final sync signal detection signal according to the output of the counter 12 and the output of the sync signal detecting circuit 14.

The operation of the sync signal detecting device thus constructed will be described with reference to FIGS. 3A to 3G.

Figure 3A:
FIGS. 3A to 3G and 4A to 4D are timing charts used for a description of the operation of the sync signal detecting device according to the invention.
Figure 3B:
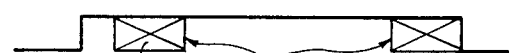

It is assumed that a sync signal consists of six words (one word containing two bytes, each of which has eight bits), and each of the first and last bytes is 00000000 (in binary—00 in hexadecimal), and each of the bytes between the first and last bytes is 11111111 (FF in hexadecimal). In this case, the sync signal pattern is as shown in the FIG. 3A. Therefore, the sync signal pattern generating circuit 13 provides a pattern signal as indicated in FIG. 3A, which is applied to the sync signal detecting circuit 14. In the case where the error detecting circuit 11 detects no error, the sync signal detecting circuit 14 applies the detection signal to the controller 15 when the digital signal applied to the circuit 14 coincides completely with the sync signal pattern.

Figure 3C:

The error detecting circuit 11 detects whether or not an error is included for every word. When no error is detected, the error detecting circuit 11 outputs a low level signal, and when an error is detected, the circuit 11 provides a high level signal (error flag). Therefore, for instance in the case where errors are present in the second and sixth words of the inputted digital signal, as shown in the part FIG. 3B, the error detecting circuit 11 applies a signal as shown in FIG. 3C to the counter 12 and the sync signal detecting circuit 14.

Figure 3D:
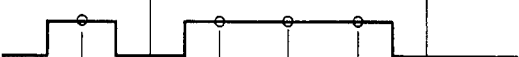
Figure 3E:
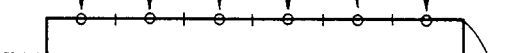

In the sync signal detecting circuit 14, the input signal is compared with the sync signal pattern for every word. As a result, the sync signal detecting circuit 14 produces a signal in which, as shown in Fig. 3D, the signal level is high when the input signal coincides with the sync signal pattern, and it is set low when not. Furthermore, in the sync signal detecting circuit 14, it is detected whether or not an error flag is present with respect to a word which is not in coincidence. When an error flag is present, the word is regarded as being coincident with the sync signal pattern. In other words, the logical sum of the signals indicated in FIGS. 3C and 3D is applied as a detection signal to the controller 15, as shown in FIG. 3E.

Figure 3F:

On the other hand, the counter 12 counts the errors in the six words. When the number of errors thus counted is two or less, the counter 12 supplies a high level signal to the controller 15, and when it is three or more, the counter 12 applies a low level signal to the controller 15. For instance, in the case of the digital signal shown in FIG. 3B, the errors are detected from two words as shown in FIG. 3C. Therefore, in this case, a high level signal is applied to the controller 15, as shown in FIG. 3F.

Figure 3G:

The controller 15 makes an decision according to the outputs of the counter 12 and the sync signal detecting circuit 14 to output a final sync detection signal, as shown in the FIG. 3G. That is, in the case where the output of the counter 12 is high (i.e., when the number of error flags is two or less), the controller 15 outputs a sync detection signal in response to the detection signal from the sync signal detecting circuit 14; however, in the case where the output of the counter 12 is low (or when the number of error flags is three or more), the controller outputs no sync detection signal.

Figure 4A:
Figure 4B:
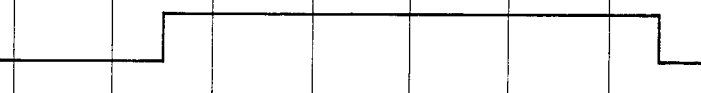
Figure 4C:
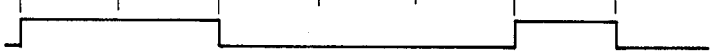
Figure 4D:
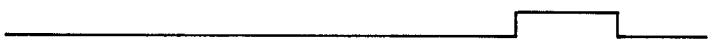

The reason why in the case where the number of error flags is three or more no sync detection signal is outputted even if a detection signal has been provided by the sync detecting circuit is that if, when a digital signal as shown in FIG. 4B is compared with a sync signal pattern as shown in FIG. 4A after being sequentially shifted in synchronization with the clock signal, errors are detected from the first, second and sixth words as shown in FIG. 4C, a sync detection signal (FIG. 4D) is outputted earlier by one word, although originally the sync detection should be outputted after the digital signal is further shifted by one word. However, in the case where errors are detected from the three words other than the first, second and sixth, erroneous detection of the sync signal position will never occur. Accordingly, in the case of such a sync signal pattern, the reference value of the counter 12 can be increased by adding an erroneous pattern detection circuit.

For instance, in the case where the sync signal contains eight bits (each being "0" or "1"), the sync signal pattern generating circuit 13 can for the most part be incorporated in the sync signal detecting circuit 14 by forming the sync detecting circuit 14 of an eight-bit OR gate or an eight-bit AND gate. As in the case of an optical digital audio disc frame sync signal, sometimes the format may be determined so that the sync signal pattern is found in the sync signal only. However, in other cases, the probability of erroneous sync signal detection can be reduced by scrambling the data other than the sync signal pattern.

The sync signal detecting device of the invention can be used to detect not only sync signals which are not periodic, but also those which are periodic.

As is apparent from the above description, the sync signal detecting device according to the invention includes a sync signal pattern generating circuit for generating a sync signal pattern for a digital signal applied thereto, a sync signal detecting circuit for comparing the digital signal with the sync signal pattern thus generated to detect a sync signal in the digital signal, an error detecting circuit for detecting errors in the digital signal, and a counter for counting errors detected by the error detecting circuit. When, in the case where no error is detected by the error detecting circuit, the comparison circuit detects the sync signal pattern and then the sync detection signal is outputted. Furthermore, when in the case where errors are detected by the error detecting circuit and the number of errors is equal to a predetermined value or less, and the part of the digital signal which is not coincident with the sync signal pattern is the part where the errors have been detected, the sync detection signal is outputted.

Therefore, it is not always necessary to provide a sync signal protecting circuit for the sync signal detecting device. The sync signal detecting device of the invention can positively detect not only sync signals which occur periodically, but also sync signals which occur aperiodically, and thereby the use of the invention results in an improved data reading probability.

We claim:

1. A sync signal detecting device comprising:
   sync signal pattern generating means for generating a sync signal pattern corresponding to an expected sync signal pattern contained in a digital signal;
   sync signal detecting means for comparing said digital signal with said sync signal pattern generated by said pattern generating means to detect a sync signal in said digital signal;
   error detecting means for detecting errors in said digital signal;
   a counter for counting errors detected by said error detecting means; and
   means for producing a detection signal as follows:
      when, in the case where no error is detected by said error detecting means, said means for producing is able to produce said detection signal when said sync signal detecting means detects said sync signal pattern, and
      when, in the case errors are detected by said error detecting means, said means for producing is able to produce said detection signal when both the number of errors detected is equal to or less than a predetermined value, and a part of said digital signal which is not coincident with said sync signal pattern is a part where an error has been detected.

2. A sync signal detecting device comprising:
   sync signal pattern generating means for generating a sync signal pattern corresponding to an expected sync signal pattern contained in a digital signal;
   sync signal detecting means for comparing said digital signal with said expected sync signal pattern generated by said pattern generating means to detect a sync signal in said digital signal;
   error detecting means for detecting errors in said digital signal;

counter means for counting errors detected by said error detecting means; and sync indication means for producing a sync indication signal in response both to both an output from said sync signal detecting means and an output from said counter means.

3. A sync signal detecting device as claimed in claim 2, wherein said sync signal detecting means assumes a match in the comparison between said expected sync signal pattern and said digital signal, during times when said error detecting means detects errors in said digital signal.

4. A sync signal detecting device as claimed in claim 2, wherein said sync indication means produces said sync indication signal as follows:

when the number of errors counted by said counter means is equal to or less than a predetermined value, said sync indication means is allowed to produce said sync indication signal in response to said output from said sync signal detecting means; and when the number of errors counted by said counter means is greater than a predetermined value, said sync indication means is inhibited from producing said sync indication signal.

5. A sync signal detecting device for detecting a sync signal in a digital signal, said sync signal detecting device comprising:

error detecting means for detecting errors in said digital signal;

sync signal pattern generating means for generating a sync signal pattern corresponding to an expected sync signal pattern contained in said digital signal;

sync signal detecting means for comparing said digital signal with said expected sync signal pattern generated by said pattern generating means to detect a sync signal in said digital signal, wherein said sync signal detecting means assumes a match in the comparison between said expected sync signal pattern and said digital signal during times when said error detecting means detects errors in said digital signal;

counter means for counting errors detected by said error detecting means; and sync indication means for producing a sync indication signal in response both to both an output from said sync signal detecting means and an output from said counter means.

6. A sync signal detecting device as claimed in claim 2, wherein said sync indication means produces said sync indication signal as follows:

when the number of errors counted by said counter means is equal to or less than a predetermined value, said sync indication means is allowed to produce said sync indication signal in response to said output from said sync signal detecting means; and when the number of errors counted by said counter means is greater than a predetermined value, said sync indication means is inhibited from producing said sync indication signal.

* * * * *